(12) United States Patent
Boddu et al.

(10) Patent No.: US 8,725,852 B1
(45) Date of Patent: May 13, 2014

(54) DYNAMIC NETWORK ACTION BASED ON DHCP NOTIFICATION

(75) Inventors: Navin Boddu, Fremont, CA (US);
Richard Kagan, San Jose, CA (US);
Stuart M. Bailey, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 150 days.

(21) Appl. No.: 13/250,982

(22) Filed: Sep. 30, 2011

(51) Int. Cl.
*G06F 11/00* (2006.01)
*G06F 15/16* (2006.01)
*G06F 15/167* (2006.01)
*G06F 15/177* (2006.01)
*G06F 15/173* (2006.01)
*H04L 12/28* (2006.01)
*H04L 12/66* (2006.01)
*H04W 4/00* (2009.01)

(52) U.S. Cl.
USPC ........... 709/221; 370/221; 370/255; 370/338; 370/352; 370/389; 709/206; 709/217; 709/219; 709/224; 709/226; 709/228; 709/229; 709/238; 709/245

(58) Field of Classification Search
None
See application file for complete search history.

(56) References Cited

U.S. PATENT DOCUMENTS

| | | | |
|---|---|---|---|
| 7,623,547 B2 | 11/2009 | Dooley et al. | |
| 8,015,204 B2 * | 9/2011 | Kaler et al. | 707/783 |
| 8,291,468 B1 * | 10/2012 | Chickering | 726/1 |
| 2002/0009078 A1 * | 1/2002 | Wilson et al. | 370/389 |
| 2002/0065806 A1 * | 5/2002 | Kim | 707/1 |
| 2003/0012182 A1 * | 1/2003 | Sato | 370/352 |
| 2005/0152287 A1 * | 7/2005 | Yokomitsu et al. | 370/255 |
| 2005/0198374 A1 * | 9/2005 | Suzuki | 709/238 |
| 2005/0220099 A1 * | 10/2005 | Igarashi | 370/389 |
| 2006/0130139 A1 * | 6/2006 | Sobel et al. | 726/22 |
| 2006/0294257 A1 * | 12/2006 | Kumano et al. | 709/245 |
| 2007/0168696 A1 * | 7/2007 | Ridel et al. | 714/4 |
| 2007/0203925 A1 * | 8/2007 | Sandler et al. | 707/100 |
| 2007/0239700 A1 * | 10/2007 | Ramachandran | 707/5 |
| 2008/0037479 A1 * | 2/2008 | Janneteau et al. | 370/338 |
| 2008/0072285 A1 * | 3/2008 | Sankaran et al. | 726/2 |
| 2008/0086544 A1 * | 4/2008 | Fukuoka et al. | 709/219 |
| 2009/0001173 A1 * | 1/2009 | Sevier et al. | 235/462.41 |
| 2009/0059945 A1 * | 3/2009 | Yokomitsu et al. | 370/419 |
| 2009/0235244 A1 * | 9/2009 | Enomori et al. | 717/170 |
| 2009/0296567 A1 * | 12/2009 | Yasrebi et al. | 370/221 |
| 2010/0088399 A1 * | 4/2010 | Gluck | 709/221 |
| 2010/0106742 A1 * | 4/2010 | Guruswamy | 707/773 |
| 2010/0332615 A1 * | 12/2010 | Short et al. | 709/217 |
| 2011/0047446 A1 * | 2/2011 | Fukuyama et al. | 714/807 |
| 2011/0055571 A1 * | 3/2011 | Gluck | 713/171 |
| 2011/0058657 A1 * | 3/2011 | Alegret et al. | 379/32.04 |
| 2011/0145206 A1 * | 6/2011 | Kahn et al. | 707/690 |
| 2011/0153854 A1 * | 6/2011 | Chickering | 709/229 |
| 2011/0202405 A1 * | 8/2011 | Clark et al. | 705/14.49 |
| 2011/0231492 A1 * | 9/2011 | Wen | 709/206 |
| 2011/0258303 A1 * | 10/2011 | Nath et al. | 709/223 |
| 2011/0264806 A1 * | 10/2011 | Tuck et al. | 709/226 |
| 2011/0276572 A1 * | 11/2011 | Wada et al. | 707/737 |
| 2011/0320394 A1 * | 12/2011 | McKeown et al. | 706/47 |

(Continued)

*Primary Examiner* — Ario Etienne
*Assistant Examiner* — Ho Shiu
(74) *Attorney, Agent, or Firm* — Van Pelt, Yi & James LLP

(57) ABSTRACT

Techniques for providing DHCP updates are provided. In various embodiments, a DHCP notification is received from a DHCP server, the notification includes a network address and a unique device identifier combination of a device. A second notification is generated in response to receiving the first notification, the second notification includes the network address and the unique device identifier combination.

20 Claims, 6 Drawing Sheets

(56) References Cited

U.S. PATENT DOCUMENTS

| | | | |
|---|---|---|---|
| 2012/0017009 A1* | 1/2012 | Short et al. | 709/238 |
| 2012/0054303 A1* | 3/2012 | Priyadarshan et al. | 709/217 |
| 2012/0096163 A1* | 4/2012 | Tai et al. | 709/226 |
| 2012/0203917 A1* | 8/2012 | Alkhalaf | 709/228 |
| 2012/0239797 A1* | 9/2012 | Agrawal et al. | 709/224 |
| 2013/0067062 A1* | 3/2013 | Gaitonde et al. | 709/224 |

* cited by examiner

DYNAMIC NETWORK ACTION BASED ON DHCP NOTIFICATION

BACKGROUND OF THE INVENTION

To effectively manage today's complex and constantly changing networks, up-to-date network device discovery and assessment are needed. Currently, discovery engines are used to periodically scan through the networks to detect and gather device intelligence. FIG. 1 illustrates such an example. Various discovery sensors and agents are placed throughout a managed network for such purposes. The discovered device information is typically stored by a Configuration Management Database (CMDB) and used by the CMDB or other network components to build network topology, diagnose device misconfiguration, policy violation, inefficiencies and security gaps, and enforce endpoint security policies, etc. However, as the network becomes large or CMDB are deployed in large networks, it can take several hours or days to complete a single scan of the network. This may allow a device to go undetected for hours or days if it happens to connect onto the network between two consecutive discovery scans, potentially pose security risks and management difficulties. As such, an improved method to discover, assess and/or profile network devices is needed.

BRIEF DESCRIPTION OF THE DRAWINGS

Various embodiments of the invention are disclosed in the following detailed description and the accompanying drawings.

DETAILED DESCRIPTION

Figure 1:
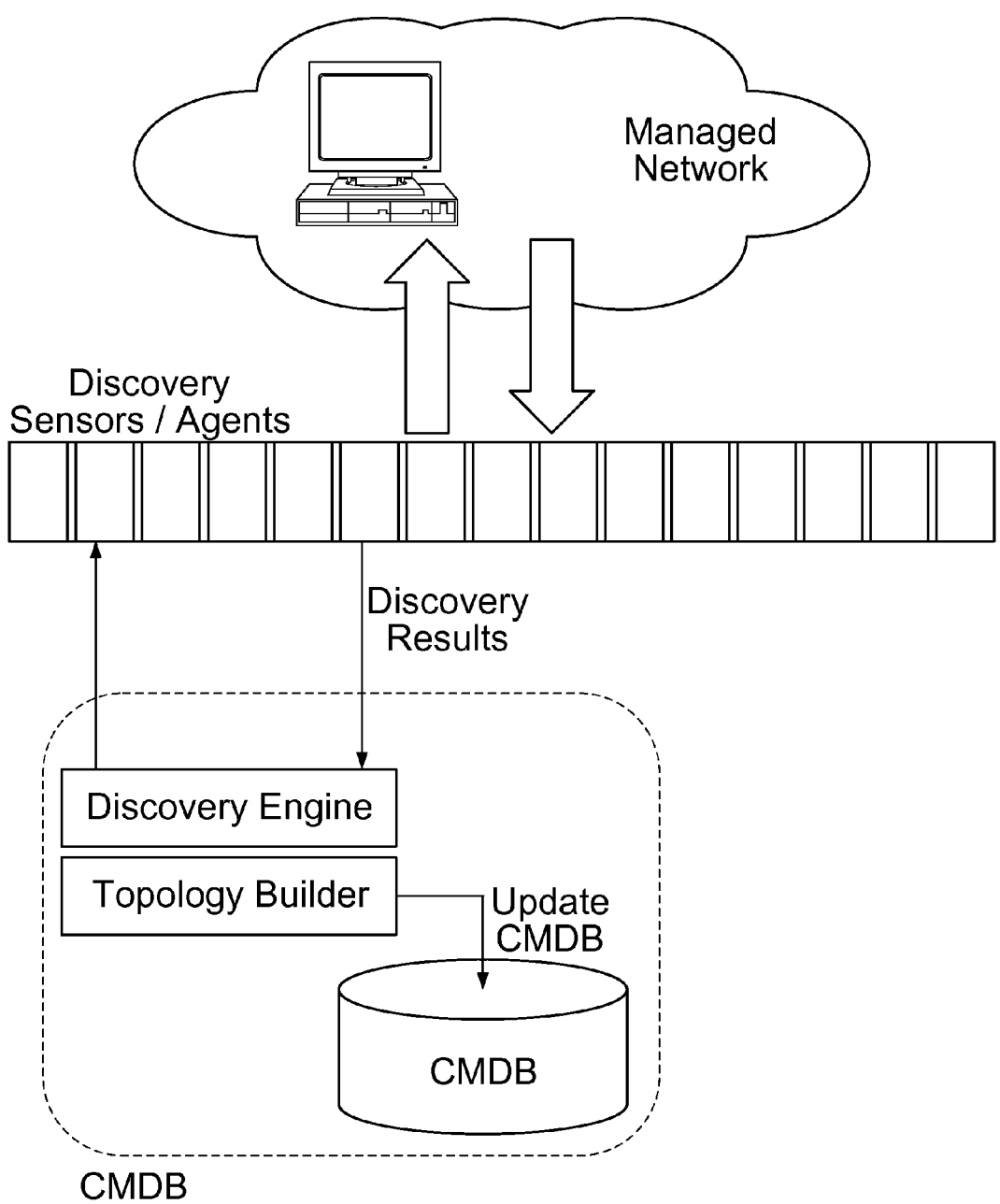
FIG. 1 is a diagram illustrating an example managed network where various discovery sensors/agents are placed throughout to discover network devices.

The invention can be implemented in numerous ways, including as a process; an apparatus; a system; a composition of matter; a computer program product embodied on a computer readable storage medium; and/or, a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing and utilizing network address allocation server notifications are provided. It is realized by the inventor(s) herein that a device in general needs a network address such as internet protocol (IP) address before it is allowed network access. Network addresses are typically assigned by an Address Allocation server or in some cases self-configured by the device using information provided by an Address Allocation server. Network addresses are often released back to the Address Allocation Server when they are no longer needed. As a consequence, the Address Allocation Server often has the most up-to-date information regarding the presence of a device on a network and its network address such as the IP address and the unique device identifier such as the MAC address. Therefore techniques are developed herein to discover, assess and profile network devices in real-time based on real-time Address Allocation Server notifications. Such information can be used to carry out various dynamic network actions or operations such as network device assessment, network device provisioning and configuration, and endpoint security enforcement.

In various embodiments, an Address Allocation Server notification is received, the notification includes a combination between a network address and a unique device identifier of a device. A second notification is generated to notify a client, the second notification includes the combination between the network address and the unique device identifier of the device. In various embodiments, the combination between the network address and the unique device identifier of the device is used by the client to perform one or more network actions associated with the device.

In one example, the invention is implemented in a network environment. Where one or more DHCP servers serve as the Address Allocation Servers. The DHCP servers send out a notification (e.g., through a DHCP publish operation) to an IF-MAP server. The notification includes an IP address and MAC address combination. The IF-MAP server in turn generates a second notification and sends the second notification to an IF-MAP client. The IP address and MAC address combination is included as part of the second notification. The IF-MAP client uses the IP address and MAC address combination to conduct various network actions associated with the device such as further device discovery, assessment, profiling and/or configuration. The discovery results and results of any assessment, profiling or configuration actions are stored in a database associated with the IF-MAP client and made available for access by other network elements.

In various embodiments, notification sent by a DHCP server to the IF-MAP server can occur instantaneously or near instantaneously when the DHCP servers issues, cancels, modifies, and/or otherwise changes an IP address lease, and notification sent by the IF-MAP server to the IF-MAP client can also occur instantaneously or near instantaneously when the IF-MAP receives an update from the DHCP server. In this way, the IF-MAP server and client can have real-time knowledge of the most up-to-date information regarding whether a device is present on a network and its IP address and MAC address combination. Such information can be used by the IF-MAP and IF-MAP client to carry out various dynamic network operations or actions such as endpoint or infrastructure (router, switch, etc.) security assessment, compliance assessment, policy enforcement or device configuration.

Figure 2:
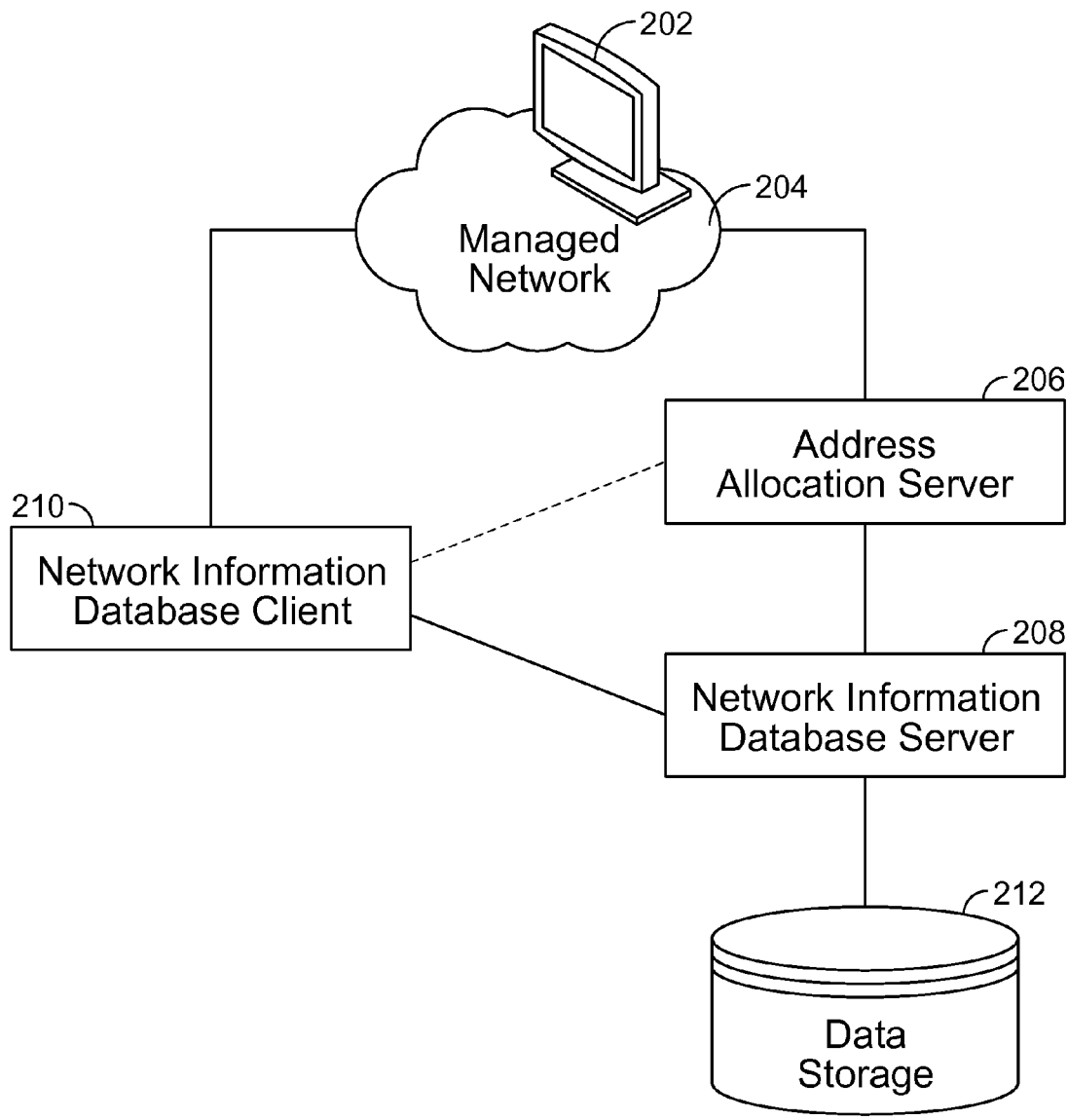
FIG. 2 is a diagram illustrating an example network environment for performing dynamic network action based on network address server notification.

FIG. 2 represents a network environment in accordance with various embodiments. The network environment includes a plurality of network devices 202 on a managed network 204, one or more Address Allocation Servers 206 configured to allocate network addresses, a Network Information Server 208 configured to receive address allocation notifications from the Address Allocation Servers 206, and one or more Network Information Server Clients 210 configured to receive notifications from the Network Information Server 208. The Network Information Server 208 is linked to one or more data storages 212 for storing update information from the Address Allocation Server 206. The Network Information Server Clients 210 may be configured to carry out various network management operations such as device discovery and profiling, device configuration, and endpoint security enforcement associated with one or more of the network devices 202 based on the received notifications.

In various embodiments, network devices 202 can be any logical or physical devices or other units having the ability to exchange data with the network. Example network devices include computers, peripheral devices, routers, switches, storage devices, sensors, phones, wired or wireless devices, appliances with processors and communication interfaces.

In various embodiments, Address Allocation Servers 206 are configured to allocate network addresses to network devices 202 in response to address allocation requests by network devices 202. Allocating a network address to a device includes assigning a network address such as an IP address and/or associating the network address with a unique device identifier such as a MAC address and/or GUID address of the device. In various embodiments, the Address Allocation Servers 206 are configured to assign dynamic and/or static network addresses to network devices. In various embodiments, one or more Address Allocation Servers 206 are dynamic host configuration protocol (DHCP) servers that are configured to assign temporary network addresses to network devices. In various embodiments, one or more Address Allocation Servers 206 utilize different network address allocation protocols. In various embodiments, one or more Address Allocation Servers 206 are associated with one or more databases 207 such as DNS databases and IPAM databases for storing the network addresses allocated to devices.

In various embodiments, the Network Information Server 208 is configured to gather network address allocation information from the Address Allocation Servers 206 and other network information sources. Network Information Server 208 can be a centralized server or a distributed computing environment. In various embodiments, a publication/subscription model is used to gather network address allocation information. In various embodiments, the Address Allocation Servers 206 publishes network address allocation information to the Network Information Server 208. The Address Allocation Servers publish update notifications if network address allocation or lease has been issued, cancelled, modified, or otherwise changed. In various embodiments, the notifications sent by the Address Allocation Servers 206 are real-time or near real-time notifications that occur instantaneously or near instantaneously when changes occur with regard to a network addresses allocation or leasing status on the Address Allocation Server(s) 206. In various embodiments, rather than the Address Allocation Servers publishing update notifications in real time, the Address Allocation Servers aggregate the update notifications and publish them periodically. The time period between consecutive aggregated bulk notifications may be set to be short (e.g., milliseconds, seconds, minutes) so that the notifications are sent practically instantaneously. Alternatively, the update notifications may be aggregated and published when the update allocations reach a predefined volume or number.

In various embodiments, the data storages 212 can be any physical or in memory data stores, example of which include magnetic hard disks, flash memory, solid state mass storage, optical drives, and tape drives. The data storages may be distributed over geographically diverse locations or centralized in one physical location.

Network Information Server Clients 210 are network components that are configured to access the Network Information Server 208. Example Network Information Server Clients include device discovery engine and network enforcement module. In various embodiments, a Network Information Server Client 210 uses the notifications received to perform one or more network actions, such as device discovery and profiling, security policy enforcement, and malicious device quarantine. In various embodiments, Network Information Server Client 210 can search and/or subscribe to publication notification of the network information stored on the Network Information Server 208. In various embodiments, the notifications sent by Network Information Server 208 are real-time or near real-time notifications that occur instantaneously or near instantaneously when changes occur with regard to a network addresses allocation or leasing status on Network Information Server 208. In various embodiments, the notifications are periodic notifications that occur periodically.

Although in this example, the Network Information Server 208 is shown as a separate entity from the Address Allocation Server(s) 202, in various embodiments, the Network Information Server 208 can be a part of an Address Allocation Server 202. Although in this example, the Network Information Server Clients 210 receive the network address allocation notifications indirectly from the Address Allocation Servers 206 via the Network Information Server 208, in various embodiments, it is possible that the Network Information Server Clients 210 can receive the network address allocation notifications directly from the Address Allocation Servers 206 without having to pass through the Network Information Server 208. However, using the Network Information Server 208 to relay the update notifications from the various Address Allocation Servers 206 has various advantages, for example when different Address Allocation Servers 206 use different protocols, rather than having all Network Information Server Clients 210 equipped to communicate different Address Allocation Servers 202 using different protocols, only the Network Information Server needs to be equipped to communicate with the different Address Allocation Servers 202 using different protocols.

Figure 3:
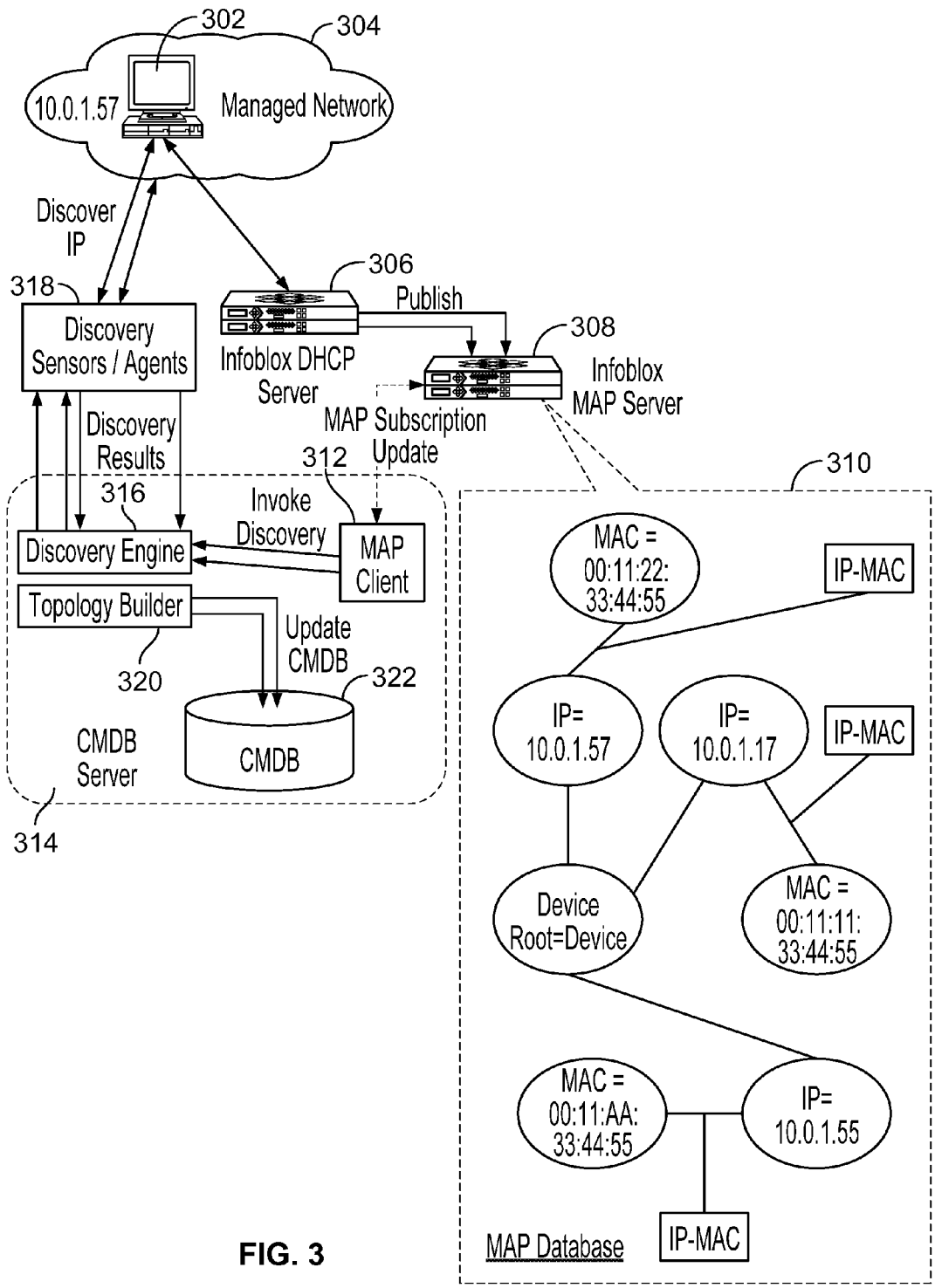
FIG. 3 is a diagram illustrating an example network environment for performing dynamic network action based on network address server notification.

FIG. 3 illustrates another network environment in accordance with various embodiments. It includes a plurality of managed network devices 302 (one is shown as a representative) on a network 304, one or more DHCP servers 306 (one is shown as a representative) configured to allocate IP addresses to network devices, and an IF-MAP server 308 linked to the DHCP servers 206 to receive address lease updates from the DHCP servers 206. The IF-MAP server 308 is shown to include a graph IF-MAP database 310 for storing network information. It also includes one or more IF-MAP clients 312 (one is shown as representative) configured to access information stored on the IF-MAP server and associated data storage. In this example shown, the example IF-MAP client 312 is executed in a CMDB server 314. The CMDB server 316 is shown to include a Discovery Engine 316 configured to conduct device discovery/assessment via various discovery sensors/agents 318 using information received from the IF-MAP server via the IF-MAP client 312. The CMDB server 314 is also shown to include a topology builder 320 configured to build the network topology using the discovery results generated by the discovery engine 316, and a CMDB database 322 for storing the discovery and topology results.

Figure 6:
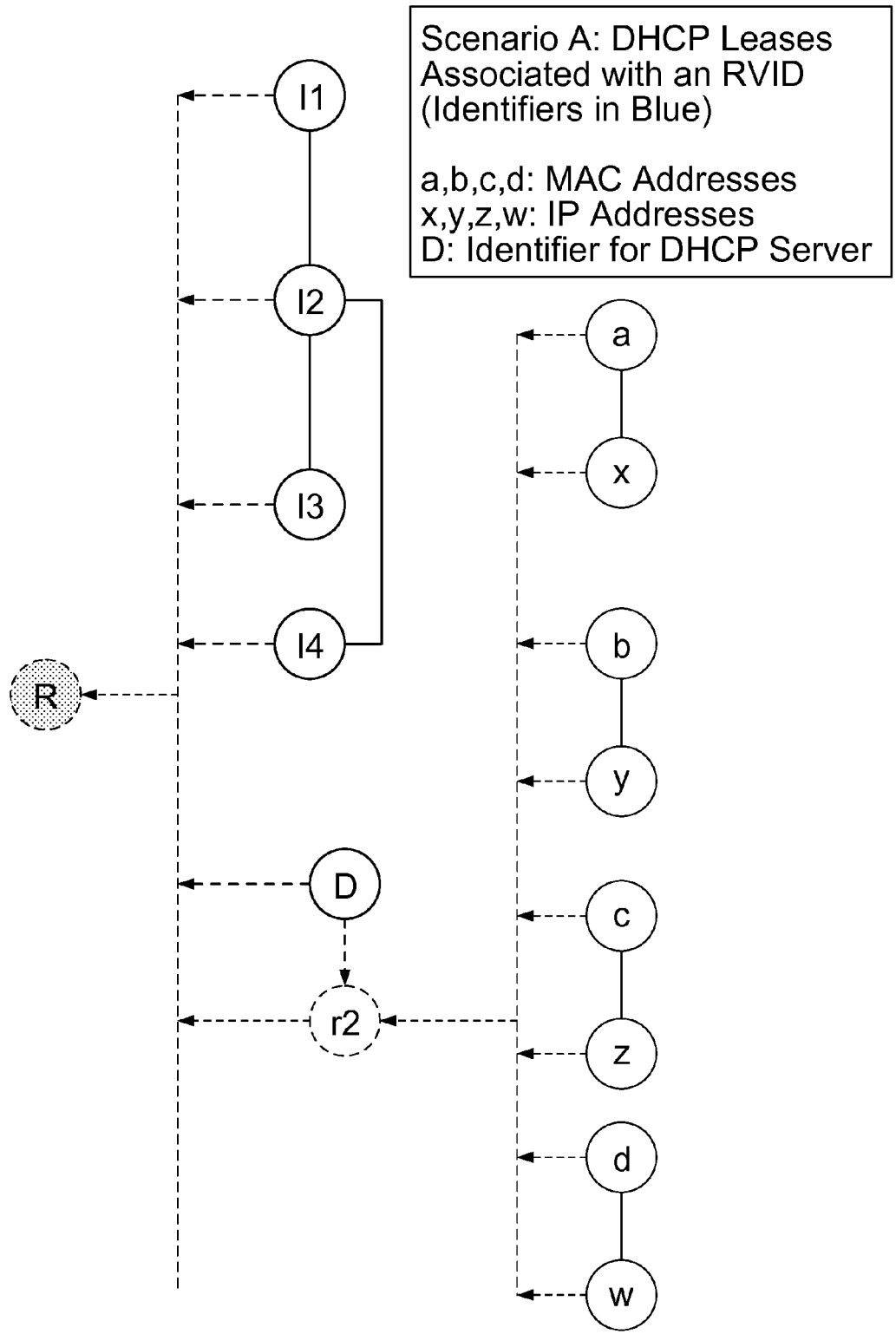
FIG. 6 is a diagram illustrating an example database associated with a Network Information Server.

IF-MAP server 308 is a Network Information Server that includes IF-MAP database for storing network information. It collects bits of network information from various sources on the network and links them together into a single "big picture" searchable graph database. In various embodiments, the IF-MAP server uses a publish/subscribe model. Network applications and components can publish information to the IF-MAP server about any system connecting to the network, and can also retrieve information from the IF-MAP server. The information (metadata) stored on the IF-MAP servers are associated with identifiers, which can be any kind of identifying information available for the information: a MAC address, IP address, port on a switch associated with the information. The information is stored as a graph that includes various nodes (represent identifiers and associated metadata) connected by various links (represent relationships between nodes). In various embodiments, in addition to real identifiers that are shared and understood by other components of the network, synthesized identifiers can be generated to link the identifiers and data in the IF-MAP database together. The synthesized identifiers can be a root identifier that is linked to all identifiers of the IF-MAP database and non-root identifiers that are each linked to all identifiers of a logical group assigned by the IF-MAP server and to the root identifier. An example IF-MAP graph database is illustrated in FIG. 6.

Potentially, any network component can be an IF-MAP client and subscribe to the IF-MAP server to learn information about the network as it happens in order to dynamically adapt to the changes occurring on the network. In particular, the IF-MAP server 308 can communicate the IP address and MAC address combination to the IF-MAP clients 310, which use the network address lease information to conduct various dynamic network actions such as network device discovery, device profiling and various other network operations.

In various embodiments, the notifications are real-time or near real-time notifications that occur instantaneously or near instantaneously when changes occur with regard to a network addresses allocation or leasing status on the DHCP server(s) 202. In various embodiments, the notifications are periodic notifications that occur periodically. The time period between two consecutive notifications can be set short to allow near real-time updates of net address allocation status. In various embodiments, the notifications are bulk update notifications published when a predefined address allocation volume has been reached. In various embodiments, the notifications are triggered by the occurrence of one or more events. In one example, the notifications to IF-MAP clients occur when the IF-MAP server learns that a device has been blacklisted.

Figure 4:
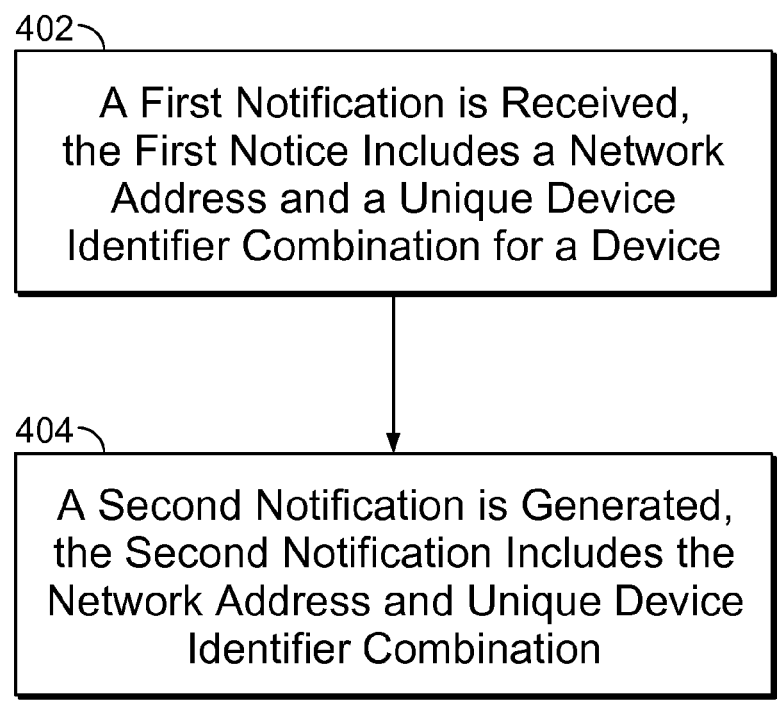
FIG. 4 is a diagram illustrating an example process for performing dynamic network action based on network address server notification.

FIG. 4 is a block diagram illustrating an embodiment of a process for providing and using Address Allocation Server notifications. The process may be implemented by a Network Information Server such as an IF-MAP server such as an IBOS server.

At 402, a first notification is received, the notification includes a network address and a unique device identifier combination for a device. The network address is a logical address assigned to a network device for receiving and sending data packets on the network. In various embodiments, the network address includes an IP address such as an IPv4 address and/or IPv6 address. In various embodiments, the device identifier is a unique identifier identifying the device. In various embodiments, the device identifier includes a statically assigned device identifier such as a Media Access Control Address (MAC address). In various embodiments, the device identifier is a dynamically assigned identifier such as a Unique Identifier (GUID) that is dynamically generated based on the device MAC address and various dynamic information such as path (e.g., nodes) used to request and/or receive the GUID, clock time/date etc. In various embodiments, the network address and the unique device identifier combination includes an IPv4 address and MAC address combination. In various embodiments, the network address and the unique device identifier combination includes an IPv6 address and GUID address combination.

In various embodiments, the device is a network-connected device that has been assigned a network address and can communicate with other devices on the network using the assigned network address. In various embodiments, the notification is triggered when the network address of the device is issued, cancelled, modified, or otherwise changed by an Address Allocation Server so that the notification contains an up-to-date or real-time network address and device identifier combination for the device. In various embodiments, the notification is received from an Address Allocation Server.

In various embodiments, the notification is pushed by an Address Allocation Server such as a DHCP server. In various embodiments, a publication/subscription model is used for sending and receiving the notification. A subscription can be placed with the Network Information Server, the Address Allocation Server publishes the notification to the Network Information Server and the Network Information Server pushes the notification to a subscriber based on the subscription. In one example, the Address Allocation Server publishes the notification when a network address lease is issued, cancelled, modified or otherwise changed, the notification is an address lease update and includes various information relating to the lease such as an assigned the network address assigned to the device, the unique device identifier of the device, additional network configuration parameters such as the subnet mask and default gateway, and lease time period. In various embodiments, the lease information is extracted from a database associated with the Address Allocation Server for storing address lease information. In various embodiments, the notification includes an IP address and an MAC address combination for the device. In various embodiments, the notification includes an IP address and GUID address of the device.

At 404, a second notification is generated, the second notification includes the network address and device identifier combination for the device. In various embodiments, the second notification is timely generated in response to receiving the first notification. In various embodiments, the second notification is generated using a communications protocol different from that used by the first notification. In various embodiments, the second notification is sent to a network component subscribing to the second notification. The network component uses the network address and device identifier combination to perform network action(s) associated with the device. An example network component that subscribe to the second notification is an IF-MAP client. The IF-MAP client can use the information included in the second notification to conduct various dynamic network actions, or other network components can use the information included in the second notification to conduct various dynamic network actions. Example actions include endpoint assessment and security policy enforcement actions. For example, the network component can use the network address and device identifier combination to direct queries to assess the device status (e.g., whether appropriate security software has been installed), monitor the device by extracting data packets sent to or from the device, apply security configuration parameters to the device, and quarantine the device by preventing other network components from sending data to or receive data from the device.

In various embodiments, the IF-MAP server is configured to receive notifications from network components other than Address Allocation Servers. For example, the IF-MAP server may be configured to receive notifications from a network security component that identifies and blacklist devices that are deemed as security risk. In various embodiments, the second notification sent by the IF-MAP server may be triggered by occurrence of one or more predefined events, such as receiving a notification that a device has been blacklisted as security threat.

Figure 5:
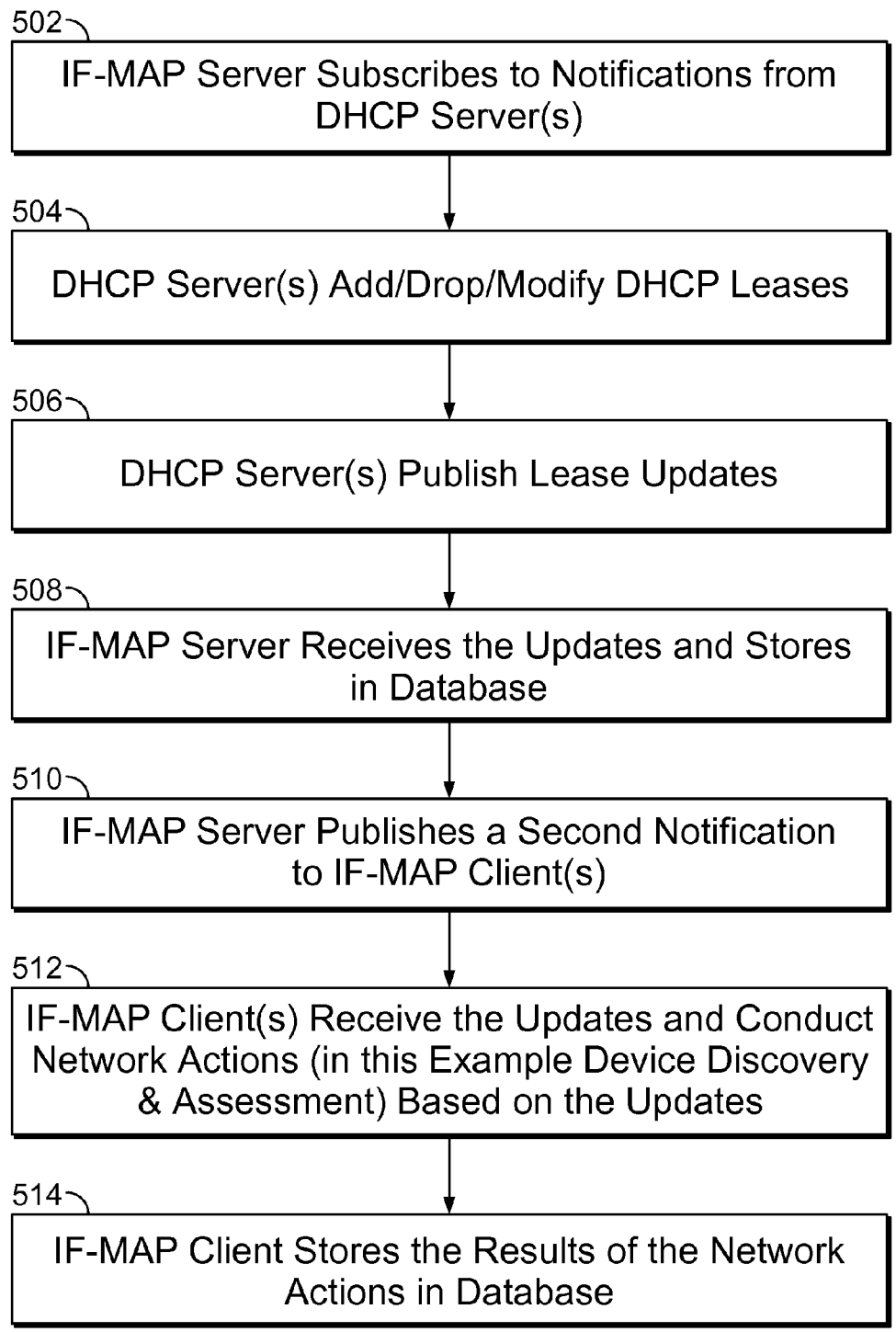
FIG. 5 is a diagram illustrating an example process performing dynamic network action based on network address server notification.

FIG. 5 is a block diagram illustrating an embodiment of a process for providing and using DHCP server notifications. This is a specific example of the process for providing and using Address Allocation Server notifications of FIG. 4.

At 502, an IF-MAP server receives notifications published by one or more DHCP servers on the network. At 504, DHCP server(s) issue, cancel, modify or otherwise change a DHCP lease to a network device.

In various embodiments, various messages are exchanged between the device and the DHCP server in the leasing process. In one example, when the device first attempts to logon to a network, it requests an IP address by broadcasting a DHCPDiscover packet. The DHCP server receives the DHCPDiscover packet and responds with a DHCPOffer packet containing an unleased IP address and additional TCP/IP configuration information, such as the subnet mask and default gateway. The DHCP server may be one of a plurality of DHCP server responding to the DHCPDiscover packet. The device receives the DHCPOffer packet from the DHCP server and responds with a DHCPRequest packet that contains the offered IP address and shows the acceptance of the offered IP address. The DHCP server acknowledges the device DHCPRequest for the IP address by sending a DHCPAck packet. The DHCP server can also forward various configuration parameters in the DHCPAck packet. Upon receipt of the DHCPAck, the device can participate on the TCP/IP network. If the IP address cannot be used by the client because it is no longer valid or is now used by another device, the DHCP server responds with a DHCPNak packet. When the device no long needs the IP address, it sends a DHCP Release packet to the DHCP server to release IP address and cancel any remaining lease.

At 506, an update is published by the DHCP server to the IF-MAP server. The update may include various address lease information including IP address and unique device identifier combinations such as IP address and MAC address combinations, and IP address and GUID combinations. In this example, a client/agent/API is installed on the DHCP server to cause the DHCP server to send out an update periodically. The time period between two consecutive publications may be set to be short (e.g., seconds, minutes), so IF-MAP server can receive up-to-date lease information from the DHCP server. In various other embodiments, the DHCP serve may alternatively send out an update immediately upon the occurrence of a predefined event, such as upon sending out a DHCOffer packet. At 508, the IF-MAP server receives the update and stores it on an associated IF-MAP database. The IF-MAP server can similarly receive update notifications from other DHCP servers.

At 510, the IF-MAP server generates and issues a notification to one or more IF-MAP clients based on their subscriptions to the IF-MAP server. The update includes the IP address and unique device identifier combination. In the example shown here, the IF-MAP client is a device discovery engine. In various embodiments, the publication is based on a subscription by the IF-MAP client. In various embodiments, the subscription is based on a synthesized identifier of the IF-MAP database that represents a logical group and is linked to all identifiers (and associated metadata) that belongs to the logical group, directly or indirectly. The subscription based on the synthesized identifier can reach all identifiers (and associated metadata and links) in the logical group represented by the synthesized identifier. In various embodiments, the synthesized identifier is a root identifier that is linked to all identifiers (and associated metadata) of the IF-MAP database, directly or indirectly. In various embodiments, the publication is broadcast to a network address. In various embodiments, the IF-MAP server publishes an update immediately when an IP address-MAC address combination is added, cancelled, modified, and/or otherwise changed in the IF-MAP database. In various embodiments, the IF-MAP server periodically sends out update regarding changes made to the IP address-MAC address combination.

At 512, the IF-MAP client(s) receive the update from the IF-MAP server. The IF-MAP client(s) use the information in the update (e.g., IP address and MAC address combination) to conduct dynamic network actions or operations. In this example, the IF-MAP client is a network Discovery Engine, it uses the IP address and MAC address combination received to conduct further device discovery, assessment and profiling. For example, the Discovery Engine can generate a network query to further discover, assess and/or profile the device using the IP address and the unique device identifier combination.

At 514, the IF-MAP client stores the discovered information on an associated DBMS database and makes it available to other network components. The security policy compliance result may be used by for example an endpoint security enforcement system of the network to decide the appropriate security actions. For example, if the device was found to have not installed all the latest security software, the security enforcement system may install the appropriate security software on the device and/or quarantine the device.

FIG. 6 is diagram illustrating an example IF-MAP graph database that includes synthesized identifiers. The example shows a plurality of identifiers (represented as circles), including actual identifiers (represented as solid circles) that are shared and understood by other network components, and synthesized identifiers (represented as dashed circles) that are artificially generated by the IF-MAP server.

The synthesized identifier is a logical identifier that represents a logical group to which the network information or the network information identifier belongs. All identifiers belonging to the logical group are linked to the synthesized identifier representing the group. A search based on the synthesized identifier representing the group can reach all identifiers and associated metadata and links of the logical group. The synthesized identifier can be root identifier, the highest level synthesized identifier representing all identifiers stored in a database. The synthesized root identifier is a unique root identifier linked to all identifiers of the database. The synthesized root identifier can be linked to a plurality of lower level synthesized non-root identifiers each representing a logical group of network information identifiers. A search based on the root synthesized identifiers can reach all identifiers (actual or synthesized) and associated metadata and links of the IF-MAP graph database.

Grouping network identifiers into logical groups and creating synthesized links linking each of the network information identifiers to a synthesized identifier that represent logical groups of network information identifiers provide a mechanism to overcome the above described limitations of the current IF-MAP servers. For example, the synthesized identifiers can be used as a reference or starting point for search/subscription definitions, as a result an IF-MAP server can search or get update via subscription without the client having to know a specific identifier. Search/subscription based on a synthesized root identifier allows the entire database to be searched without prior knowledge of any specific identifier. Search/subscription based on a synthesized identifier other than the synthesized root identifier allows information in only a section of the database represented by the synthesized identifier to be search without prior knowledge of any specific identifier in the logical group.

To generate the IF-MAP graph database, when an identifier (e.g., MAC address, IP address, GUID address, domain name, application name) and associated metadata for a network information from a client is received, the identifier and the associated metadata is stored as a node in the IF-MAP graph database, links are generated linking the identifier to other identifiers in the IF-MAP graph database. Links are generated based on the relationships provided by the metadata and/or based on relationships determined based on a set of rules/policies. In addition to natural links that reflect actual relationships outside of the IF-MAP server in the network, synthesized identifiers and links can be created in the IF-MAP graph database.

In various embodiments, the network address lease update received from a DHCP server includes IP address and unique device identifier combinations for various devices. In the example shown, all IP address and unique device identifier combinations are linked to a synthesized identifier (r2) representing all IP address and unique device identifier combinations. r2 is linked to all IP address and unique device identifier combinations of the IF-MAP database. In various embodiments, the IP addresses are linked to an IP address synthesized identifier (not shown) representing all IP addresses of the IF-MAP database via a synthesized link (represented as dashed line). The MAC addresses are linked to a MAC address synthesized identifier (not shown) representing all MAC addresses of the IF-MAP database via a synthesized link. Each pair of IP address and MAC address in an IP address and MAC address combination are linked to each other via an IF-MAP link (represented as solid line). Via the various links, the data in the entire IF-MAP database are linked into a continuous network.

The IF-MAP graph database can be searched or subscribed based on identifiers and metadata. Search and subscription based on a synthesized identifier can potentially reach (examine) all identifiers and associated metadata that belong to a logical group represented by the synthesized identifier since all identifiers and associated metadata are linked to the synthesized identifier, directly or indirectly. If the search or subscription is based on a synthesized root identifier, the search or subscription can reach (examine) all identifiers and associated metadata in the IF-MAP graph database since all identifiers and associated metadata are linked to the synthesized root identifier, directly or indirectly. For example search based on an IP address synthesized identifier representing all IP addresses of the IF-MAP database can potentially reach (examine) all IP addresses of the IF-MAP database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a DHCP update, comprising:
   receiving a DHCP notification from a DHCP server, the notification includes a network address and a unique device identifier combination of a device;
   generating a second notification that includes the network address and the unique device identifier combination to a client, wherein the client is separate from the device; and
   storing the network address and unique device identifier combination in a continuous database, wherein the continuous database is a graph database, wherein the storing of the network address and unique device identifier combination in the continuous database includes:
      synthesizing an identifier corresponding with a root identifier; and
      linking the network address and unique device identifier combination to the synthesized identifier, wherein all identifiers (representing nodes) of the graph database are linked to the synthesized identifier directly or indirectly,
   wherein the second notification is subscribed by an IF-MAP client,
   wherein the IF-MAP client is executed on a CMDB server,
   wherein the IF-MAP client is coupled to a network component configured to conduct dynamic network actions based on the network address and device identifier combination, and
   wherein the network component is a discovery engine configured to use the network address and unique device identifier combination to perform device discovery and assessment.

2. The method of claim 1, wherein the notification is pushed by the DHCP server to the recipient.

3. The method of claim 1, wherein the DHCP notification is published by the DHCP server.

4. The method of claim 1, wherein the DHCP notification is published by the DHCP server based on a subscription.

5. The method of claim 1, wherein the second notification is sent to an IF-MAP client subscribing to the second notification.

6. The method of claim 1, wherein the discovery engine is in communication with a configuration management data base (CMDB database) configured to store the DHCP update information and discovery results.

7. The method of claim 1, wherein the DHCP notification is received at an IF-MAP server.

8. The method of claim 1, wherein the DHCP notification is received at an IF-MAP server, and wherein an IF-MAP client executed on the DHCP server publishes the DHCP updates to the IF-MAP server.

9. The method of claim 1, wherein the notification includes an update to a network address lease add/drop information.

10. The method of claim 1, wherein the notification includes an IP/MAC addresses combination.

11. The method of claim 1, wherein the network address includes an IPv4 address, the unique device identifier includes a MAC address of the device.

12. The method of claim 1, wherein the network address includes an IPv6 address, the unique device identifier includes a GUID identifier of the device.

13. The method of claim 1, further comprising storing the network address and unique device identifier combination in a continuous database.

14. The method of claim 1, wherein the DHCP notification is a real-time update sent out by the DHCP server instantaneously when a DHCP lease add/drop status change on the DHCP server.

15. The method of claim 1, wherein the second notification is a real-time update sent to a client instantaneously when the DHCP notification is received from the DHCP server.

16. The method of claim 1, wherein the second notification is triggered by the occurrence of one or more predefined events.

17. The method of claim 1, further comprising performing a dynamic network action based on the received second notification.

18. The method of claim 1, wherein the graph database includes a plurality of synthesized identifiers.

19. A system for providing a DHCP update, comprising a memory coupled to a processor configured to perform the steps of:
    receiving a DHCP notification from a DHCP server, the notification includes a network address and a unique device identifier combination of a device;
    generating a second notification that includes the network address and the unique device identifier combination to a client, wherein the client is separate from the device; and
    storing the network address and unique device identifier combination in a continuous database, wherein the continuous database is a graph database, wherein the storing of the network address and unique device identifier combination in the continuous database includes:
        synthesizing an identifier corresponding with a root identifier; and
        linking the network address and unique device identifier combination to the synthesized identifier, wherein all identifiers (representing nodes) of the graph database are linked to the synthesized identifier directly or indirectly,
    wherein the second notification is subscribed by an IF-MAP client,
    wherein the IF-MAP client is executed on a CMDB server,
    wherein the IF-MAP client is coupled to a network component configured to conduct dynamic network actions based on the network address and device identifier combination, and
    wherein the network component is a discovery engine configured to use the network address and unique device identifier combination to perform device discovery and assessment.

20. A computer program product for managing network information in an IF-MAP database, the computer program product being embodied in a non-transitory, computer readable storage medium and comprising computer instructions for:
    receiving a DHCP notification from a DHCP server, the notification includes a network address and a unique device identifier combination of a device;
    generating a second notification that includes the network address and the unique device identifier combination to a client, wherein the client is separate from the device; and
    storing the network address and unique device identifier combination in a continuous database, wherein the continuous database is a graph database, wherein the storing of the network address and unique device identifier combination in the continuous database includes:
        synthesizing an identifier corresponding with a root identifier; and
        linking the network address and unique device identifier combination to the synthesized identifier, wherein all identifiers (representing nodes) of the graph database are linked to the synthesized identifier directly or indirectly,
    wherein the second notification is subscribed by an IF-MAP client,
    wherein the IF-MAP client is executed on a CMDB server,
    wherein the IF-MAP client is coupled to a network component configured to conduct dynamic network actions based on the network address and device identifier combination, and
    wherein the network component is a discovery engine configured to use the network address and unique device identifier combination to perform device discovery and assessment.

* * * * *